Figure 1:
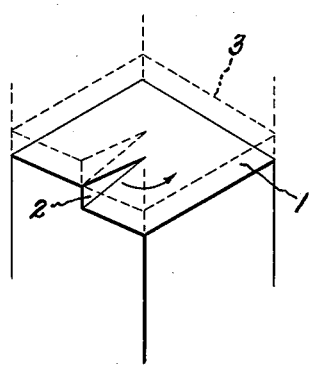

Nov. 19, 1957 G. W. SEARS 2,813,811
HIGH STRENGTH CRYSTALS
Filed Nov. 24, 1954

Inventor:
Gerald W. Sears,
by Paul A. Frank
His Attorney.

2,813,811
HIGH STRENGTH CRYSTALS

Gerald W. Sears, Galway, N. Y., assignor to General Electric Company, a corporation of New York Application November 24, 1954, Serial No. 470,944

15 Claims. (Cl. 148—1.6)

This invention relates to the improvement of the mechanical properties of crystalline materials and, more particularly, to crystals having strengths several hundred percent greater than any previously known.

The values of the mechanical properties, such as tensile strength, elastic limit, etc., of known materials are very much lower than their theoretical properties. This discrepancy between theoretical and actual values has been attributed in the past to several causes. It has been concluded that the relatively low values of the mechanical properties of known structural materials is for the greater part caused by inherent defects in the crystal structure of these materials such as dislocations, for example. My invention is concerned with the elimination of all or nearly all of these structural defects to produce materials having mechanical properties which are equal to or closely approach the theoretical values.

A principal object of my invention is the provision of a method of producing nearly perfect crystalline material having values of mechanical properties far in excess of those now obtainable.

A further object of my invention is the provision of nearly perfect crystalline structural elements having values of mechanical properties far in excess of those now obtainable.

Other and different objects of my invention will become apparent to a person skilled in the art from the following detailed disclosure and claims.

As stated previously, the strengths or mechanical properties of known materials are considerably lower than their theoretical properties. For example, the theoretical elastic limit for iron is of the order of 300,000 p. s. i. (pounds per square inch) assuming about 1.5% elastic strain whereas actually iron in the form of single crystals as heretofore known has an elastic limit of only about 6,000 p. s. i. for about 0.03% elastic strain. Similarly, the theoretical elastic limit of silver in the form of single crystals is of the order of 160,000 p. s. i. assuming about 1.5% elastic strain while values as small as 85 p. s. i., corresponding to about 0.001% elastic strain have previously been attained. All of these previously known materials have had one important characteristic in common, i. e., their crystalline structure has had the usual large number of imperfections, such as dislocations, etc. If a material could be made without these imperfections or at least with a minimum number of imperfections, it should exhibit much higher mechanical properties.

Accordingly, I have discovered that such a crystal structure can be produced by controlling certain factors during crystallization. The source of most of the imperfections present in conventional crystals is the rate of nucleation on a growing surface. If the nucleation proceeds at a very high rate due to supercooling of a liquid phase or due to a high degree of supersaturation of a vapor phase, the resulting crystalline structure has the customary high number of imperfections. I have discovered that near-perfect crystals can be deposited from the vapor phase by deposition upon the surface of a suitable substrate.

Further, if the substrate surface presents one or more emergent screw dislocations, and the supersaturation of the vapor is maintained at a value less than that necessary to cause crystal growth by two-dimensional nucleation, a rod-like crystal of substantial length can be produced which has only one axially disposed defect.

Figure 2:
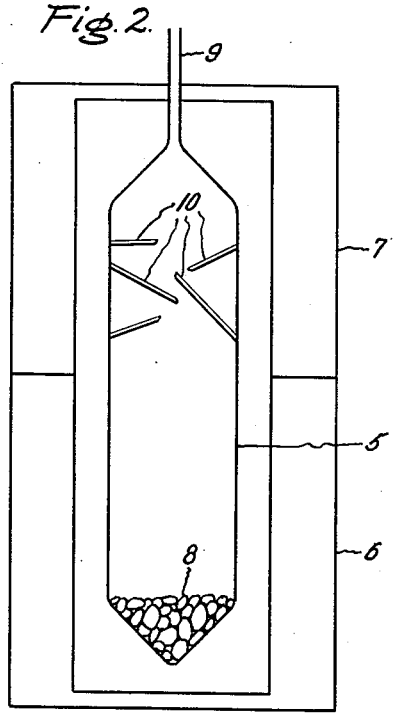

In the detailed disclosure to follow, reference will be made to the accompanying drawing in which:

Fig. 1 is a schematic representation of a screw dislocation and crystal growth therefrom, and Fig. 2 is a schematic representation of apparatus capable of producing near-perfect crystals.

To more fully explain and disclose the probable theory of a growth mechanism capable of producing near-perfect crystals, reference is made to Fig. 1 of the drawing. Assume that a surface of a material, such as glass or quartz glass or the like, presents a small crystalline patch or submicroscopic crystal which has a surface configuration comprising a "screw dislocation" as illustrated at reference numeral 1. Metallurgists generally agree that the predominant characteristic of a screw dislocation is a generally triangular step-like formation such as shown at 2. This formation has a dimension directly related to that of the interlayer spacing of the substrate material and acts as a nucleation catalyst for vapor deposition. If the supersaturation of the vapor to be deposited on the substrate is maintained at a value below that necessary for two-dimensional nucleation, solid material will nucleate upon the step 2, causing the step portion of the screw dislocation to progress by rotation about the apex of the triangular step in the direction of the arrow and a layer of material will be deposited in a regular manner upon the substrate as indicated by the dashed lines, as at 3. It will be noted that the step-like formation is not destroyed by the addition of this layer but merely effectively rotates during deposition. If the conditions for this type of deposition are maintained, this process will continue, forming a rod-like crystal having only a single, axially disposed defect, or screw dislocation.

The apparatus shown in Fig. 2 is a diagrammatic representation of an embodiment of an apparatus capable of producing near-perfect crystals. An enclosure 5 made of any suitable material such as glass or quartz glass, for example, is supported as shown within the interiors of two superposed furnaces 6, 7. A portion of the material to be treated, 8, is provided in the bottom of enclosure 5. The upper end of enclosure 5 is provided with a conduit 9 by means of which the interior of the enclosure may be evacuated by suitable vacuum pump means. In operation, the conduit 9 may be sealed off after evacuation, if desired.

Furnaces 6 and 7 may be similarly constructed and can be of any suitable design. For example, conventional tubular electrical resistance furnaces wound with Nichrome wire have been used, the temperatures of the furnaces being controlled by conventional thermocouple control circuits, not shown.

In operation, furnace 6 is operated at a temperature $T_1$, while furnace 7 is operated at a different temperature $T_2$ such that $T_1$ is greater than $T_2$. When the temperature difference is properly adjusted so that the proper degree of supersaturation of the vaporized material is maintained, rod-like crystals of the material are deposited upon the upper walls of container 5 as indicated at 10. Examination of crystals 10 shows that they are single, near-perfect crystals having nearly theoretical mechanical properties.

High strength, near-perfect crystals of cadmium, zinc, silver and cadmium sulfide have been grown by deposition from the vapor phase. The required deposition temperature $T_2$, the calculated critical supersaturation for two-dimensional nucleation, $\alpha$ calc., and the vapor temperature $T_1$ used for these materials are listed in the following Table I.

*Table I*

|  | $\alpha$ calc. | $T_2$, °C. | $T_1$, °C. |
|---|---|---|---|
| Cadmium | 24 | 250 | 330 |
| Zinc | 7 | 350 | 375 |
| Silver | 4 | 850 | 940 |
| Cadmium Sulfide | small (2) | 800 | 810 |

The supersaturation $\alpha$ is a ratio expressed as $p/p_0$ in which $p$=the partial pressure of the vapor and $p_0$=the equilibrium pressure of the vapor at $T_2$.

It will be noted that the supersaturation value for cadmium sulfide is not as definitely shown in Table I as the corresponding values for the other materials. This is because a precise calculation was not possible since no published vapor pressure data was known. Instead, the pertinent values were estimated from its rate of distillation. In view of the behavior of the material, its critical supersaturation ratio is of the order of 2.

From the foregoing, it is to be reasonably inferred that any material capable of being deposited upon a suitable substrate from the vapor phase may be so deposited in the form of a rod-like near-perfect single crystal providing the supersaturation of the vapor is kept below that necessary for two-dimensional nucleation. The relation between supersaturation $\alpha$ and surface nucleation rate $\dot{N}$ for any given material may be expressed by the equation, $$\log_n \alpha = \frac{\pi a \theta^2 M}{\rho k T^2 R \log_n \frac{B}{\dot{N}}}$$

in which $B=10^{20}$ sec.$^{-1}$, $a$ is the interlayer spacing, $\rho$ is the density, $\theta$ is the surface free energy, M is the molecular weight, $k$ is Boltzmann's constant, R is the molar gas constant and T is the absolute deposition temperature in degrees Kelvin. Where the value for $\theta$ is uncertain, a reasonably close approximation may be made by using the value for the surface tension of the liquid metal for the surface free energy of the solid. In view of the fact that values for various materials for the several terms in the equation may be readily obtained from standard reference works, no further discussion is deemed necessary.

Near-perfect crystals made according to my invention are useful because of their extraordinary mechanical properties as structural elements, such as springs, strain gauge elements and the like. The smaller crystals may also be used as "seed" crystals to grow larger crystals from a melt or by electrolysis.

From the foregoing, it is apparent that I have provided a novel, useful process for producing heretofore unknown near-perfect high-strength crystals. In the foregoing description of my invention, the several specific embodiments thereof have been cited as exemplary and I intend in the appended claims to cover all changes and modifications which do not constitute departures from the spirit and scope of the invention.

What I claim as new and desire to secure by Letters Patent of the United States is:

1. A method for producing high strength near-perfect single crystals by deposition from the vapor phase comprising the steps of vaporizing the material to be deposited, exposing a suitable substrate to contact with the vapor, controlling the degree of supersaturation of the vapor by the adjustment of the temperature of the vapor according to the equation $$\log_n \alpha = \frac{\pi a \theta^2 M}{\rho k T^2 R \log_n \frac{B}{\dot{N}}}$$

in which $\alpha$ is the ratio of the partial pressure of the vapor to the equilibrium partial pressure of the vapor at the deposition temperature, $a$ is the interlayer spacing of the material, $\rho$ is the density of the material, $\theta$ is the surface free energy of the material, M is the molecular weight of the material, $k$ is Boltzmann's constant, R is the molar gas constant, B is equal to $10^{20}$ seconds$^{-1}$ and T is the deposition temperature in degrees Kelvin, and maintaining the deposition temperature of the substrate below that of the vapor so that two-dimensional nucleation of the material on the substrate is substantially prevented and single, near-perfect rod-like crystals of the material are formed upon the substrate.

2. The method recited in claim 1 in which each of the single, rod-like crystals has a single, axially disposed screw dislocation.

3. The method for producing high strength near-perfect single crystals of cadmium by deposition from the vapor phase comprising the steps of vaporizing cadmium, exposing a suitable substrate to contact with the cadmium vapor, maintaining the supersaturation of the cadmium vapor at a value less than about 24 and maintaining the temperature of the substrate at about 250° C. whereby single near-perfect rod-like crystals of cadmium are deposited upon the substrate.

4. The method recited in claim 3 in which each of the rod-like cadmium crystals has a single, axially disposed screw dislocation.

5. A method for producing high strength near-perfect single crystals of cadmium by deposition from the vapor phase comprising the steps of vaporizing cadmium in a container, maintaining at least a portion of the container wall at a temperature less than the temperature of the vapor and the supersaturation of the cadmium vapor at a value less than about 24 whereby single, near-perfect rod-like crystals of cadmium each having a single axially disposed screw dislocation are deposited upon said portion of the container wall.

6. A method for producing high strength, near-perfect single crystals of zinc by deposition from the vapor phase comprising the steps of vaporizing zinc, exposing a suitable substrate to contact with the zinc vapor, maintaining the supersaturation of the zinc vapor at a value less than about 7 and maintaining the temperature of the substrate at about 350° C. whereby single near-perfect rod-like crystals of zinc are deposited upon the substrate.

7. The method recited in claim 6 in which the rod-like zinc crystals have a single axially disposed screw dislocation.

8. A method for producing high strength, near-perfect single crystals of zinc by deposition from the vapor phase comprising the steps of vaporizing zinc in a container, maintaining at least a portion of the container wall at a temperature less than the temperature of the vapor and the supersaturation of the zinc vapor at a value less than about 7 whereby single, near-perfect rod-like crystals of zinc each having a single axially disposed screw dislocation are deposited upon said portion of the container wall.

9. A method for producing high strength, near-perfect single crystals of silver by deposition from the vapor phase comprising the steps of vaporizing silver, exposing a suitable substrate to contact with the silver vapor, maintaining the supersaturation of the silver vapor at a value less than about 4 and maintaining the temperature of the substrate at about 850° C. whereby single near-perfect rod-like crystals of silver are deposited upon the substrate.

10. The method recited in claim 9 in which each of the single rod-like crystals has a single, axially disposed screw dislocation.

11. A method for producing high-strength, near-perfect single crystals of silver by deposition from the vapor phase comprising the steps of vaporizing silver in a container, maintaining at least a portion of the container wall at a temperature less than the temperature of the vapor and the supersaturation of the silver vapor at a value less than about 4 whereby single, near-perfect rod-like crystals of silver each having a single axially disposed screw dislocation are deposited upon said portion of the container wall.

12. A method for producing high strength near-perfect single crystals of cadmium sulfide by deposition from the vapor phase comprising the steps of vaporizing cadmium sulfide, exposing a suitable substrate to contact with the cadmium sulfide vapor, maintaining the supersaturation of the cadmium sulfide vapor at a value of the order of about 2 and maintaining the temperature of the substrate at about 810° C. whereby single near-perfect rod-like crystals of cadmium sulfide are deposited upon the substrate.

13. The method recited in claim 12 in which each of the rod-like cadmium sulfide crystals has a single axially disposed screw dislocation.

14. A method for producing high strength, near-perfect single crystals of cadmium sulfide from the vapor phase comprising the steps of vaporizing cadmium in a container, maintaining at least a portion of the container wall at a temperature less than the temperature of the vapor and the supersaturation of the cadmium sulfide at a value of the order of about 2 whereby single near-perfect rod-like crystals of cadmium sulfide each having a single axially disposed screw dislocation are deposited upon said portion of the container wall.

15. A single rod-like near-perfect crystal having a single axially disposed screw dislocation.

References Cited in the file of this patent
UNITED STATES PATENTS

| | | |
|---|---|---|
| 1,256,929 | Schaller et al. | Feb. 19, 1918 |
| 1,617,161 | Koref et al. | Feb. 8, 1927 |
| 2,673,167 | Vines | Mar. 23, 1954 |
| 2,685,547 | Holzmann et al. | Aug. 3, 1954 |

OTHER REFERENCES

Shockley: Solid State Physics in Electronics and in Metallurgy, Journal of Metals, vol. 4, No. 8, August 1952, pages 829–842.

Partington: An Advanced Treatise on Physical Chemistry, vol. III, New York: Longmans, Green, 1952, pages 17, 27.

Kiyama et al.: The Strength of Single Crystals of Inorganic Salts, reported in vol. 46, Chem. Abstracts, 3822h (1952).

Darken et al.: Physical Chemistry of Metals, N. Y.: McGraw Hill, 1953, pages 300–301.